(No Model.)

W. BLAKELY.
VELOCIPEDE.

No. 450,907. Patented Apr. 21, 1891.

Witnesses.
E. M. Clark
C. Sedgwick

Inventor
W. Blakely
by Munn
Attorneys

UNITED STATES PATENT OFFICE.

WILLIAM BLAKELY, OF VERNON, BOURNEMOUTH WEST, ENGLAND.

VELOCIPEDE.

SPECIFICATION forming part of Letters Patent No. 450,907, dated April 21, 1891.

Application filed July 1, 1890. Serial No. 357,411. (No model.) Patented in England February 5, 1889, No. 2,058.

*To all whom it may concern:*

Be it known that I, WILLIAM BLAKELY, estate agent, of Vernon, Bournemouth West, in the county of Dorset, England, have invented new and useful Improvements in Foot-Rests for Bicycles and Tricycles, (for which I have obtained Letters Patent in the following country, namely: Great Britain, dated February 5, 1889, No. 2,058,) of which the following is a full, clear, and exact description.

My improvements in foot-rests for bicycles and tricycles have for object to diminish the shocks and jars transmitted to the legs of the rider when descending steep hills at high speeds with the feet on the rests.

The improvements consist in a sliding spring-supported and elastic foot-rest, as hereinafter described and claimed.

Reference is to be had to the accompanying drawings, forming part of this specification, wherein—

Figure 1:
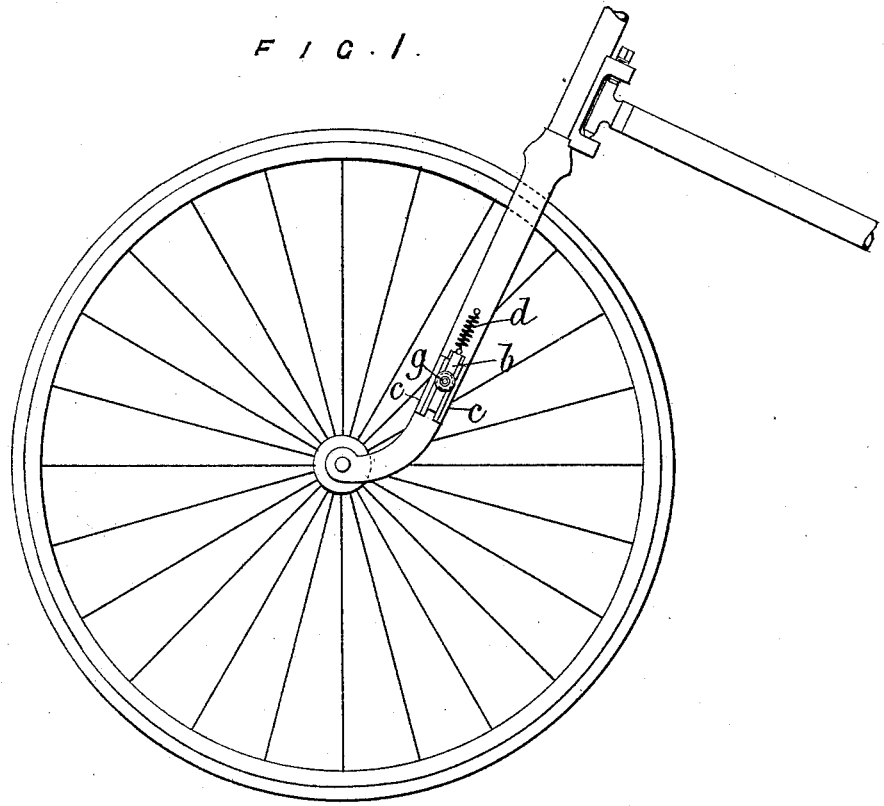
Figure 2:
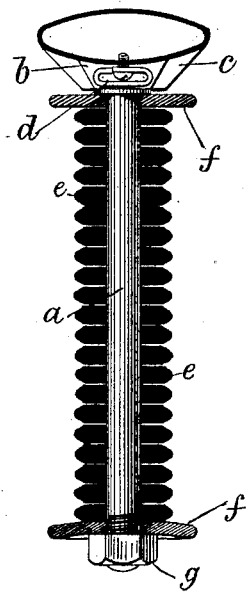

Figure 1 is an elevation of part of the steering fork or frame with the improved foot-rest applied thereto, and Fig. 2 is a longitudinal section of the foot-rest proper.

The same letters of reference indicate like parts in both figures.

The foot-rest is formed of an L-piece, one limb of which is a pin $a$, and the other limb $b$ a plate fitted to slide up and down between dovetailed guides or gibs $c$ on the steering fork or frame. This foot-rest is supported in these guides by a spring $d$, which in the example illustrated, is in tension, being attached by its lower end to the upper end of the plate $b$ and by its upper end to the fork or other part of the frame to which the foot-rest is applied. The spring is preferably of the flattened or oblong form in cross-section represented in Fig. 2, so that it will not project so far as to be in the way of the rider's foot; or the spring may act in compression and be situated beneath the lower end of the plate $b$, in which case it would be contained in a socket or otherwise be prevented from being displaced when compressed. The pin $a$ projects in the usual horizontal position, and is covered by an elastic cushion formed of juxtaposed V-edged annular disks $e$, of vulcanized india-rubber, slipped onto the core or pin $a$ and clamped together between metal end disks or flanges $f$ by means of a nut $g$ screwing on the end of the pin. The corrugated surface presented by the assemblage of V-edged disks $e$ renders the elastic covering softer and affords a better grip for the foot, while the end flanges $f$ being of larger diameter prevent the foot slipping off.

Having now particularly described and ascertained the nature of the said invention and in what manner the same is to be performed, I declare that what I claim is—

1. In a bicycle or tricycle, the combination, with a foot-rest, of guides on the fork or frame permitting up-and-down motion of the foot-rest, and of a spring upholding the foot-rest in its guides and affording an elastic support for the rider's foot, substantially as specified.

2. In a bicycle or tricycle, the combination, with a foot-rest fitted to slide up and down in guides on the fork or frame, as described, of a spiral spring of flattened or oval form in cross-section attached to the upper end of the sliding base of the foot-rest and to a fixed point, substantially as specified.

3. In a bicycle or tricycle foot-rest, the combination, with a core or pin $a$, of juxtaposed V-edged disks $e$ of india-rubber threaded on the said pin $a$ and compressed in the longitudinal direction of the pin, as specified.

4. In a bicycle or tricycle foot-rest, the combination, with a central pin $a$, of a covering of india-rubber presenting a circularly-corrugated surface and formed of juxtaposed V-edged disks $e$ of india-rubber compressed in the longitudinal direction of the pin between end flanges $f$ and nut $g$, as specified.

5. In a bicycle or tricycle, the combination, with an L-shaped piece constituted by a pin $a$ integral with a plate $b$, of dovetail guides or gibs $c$ on the frame, in which plate $b$ is fitted to slide up and down, a spring $d$, supporting the foot-rest in its guides, and an elastic circularly-corrugated covering for the pin $a$, consisting of juxtaposed V-edged india-rubber disks clamped upon said pin by end flanges $f$ and nut $g$, all substantially as specified.

The foregoing specification of my improvements in foot-rests for bicycles and tricycles signed by me this 10th day of April, 1890.

WILLIAM BLAKELY.

Witnesses:
   GEO. J. B. FRANKLIN,
   W. S. NORWOOD,
*Both of 17 Gracechurch Street, London, E. C., Notary's Clerks.*